Patented Nov. 29, 1927.

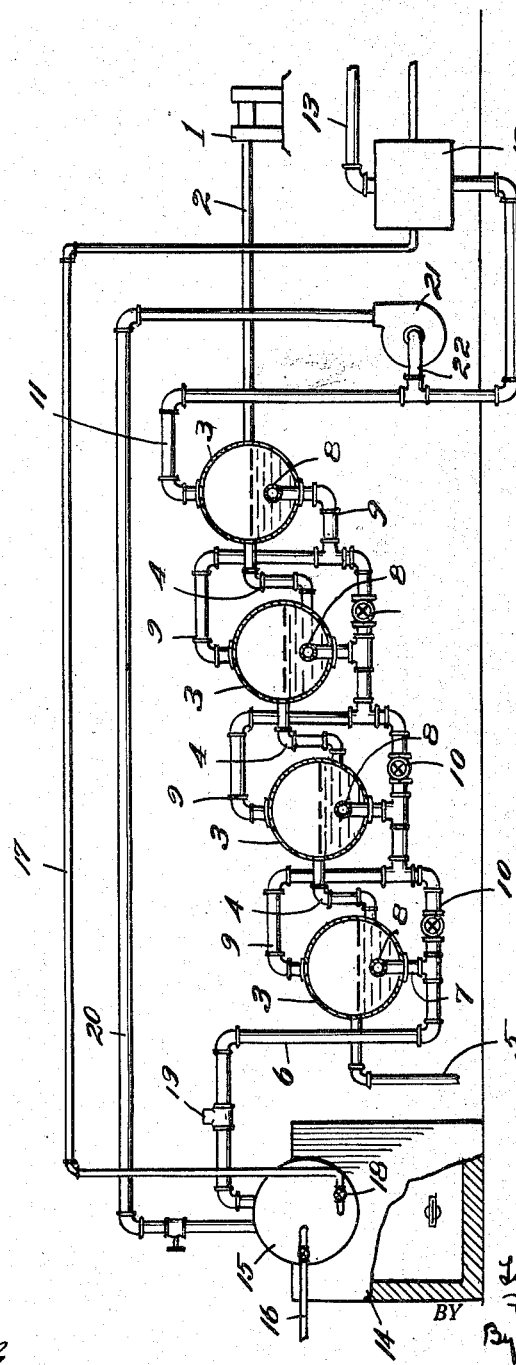

1,650,813

UNITED STATES PATENT OFFICE.

LOUIS E. WINKLER AND FRED C. KOCH, OF WICHITA, KANSAS.

PROCESS OF AND APPARATUS FOR REFINING PETROLEUM AND OIL-FIELD EMULSIONS.

Application filed September 20, 1926. Serial No. 136,526.

This invention relates to a process of and apparatus for refining or cracking petroleum, and is more especially designed for the treatment of oil field emulsions.

Heretofore there has been on comparatively inexpensive method for the treatment of oil field emulsions due to the very corrosive nature of the materials, it being necessary to heat it to such a point as to crack the wax for the recovery of the fuel oil, permit the salt to settle to the bottom of the evaporator, and to evaporate and withdraw the water entrapped in the emulsion, the water content varying to a very large extent.

Another object is to produce a process and apparatus employing the products of combustion or flue gas to heat and crack oil emulsions or petroleum, the rate of combustion and, therefore, the temperature of the flue gases being under constant control of the operator of the process whereby it is possible to regulate the extent of the breaking down of the liquid material.

With these general objects named in view and others as will hereinafter appear, the invention consists in certain novel and useful features of construction and organization of parts as will hereinafter appear; and in order that it may be fully understood, reference is to be had to the accompanying drawing, in which the preferred form of the apparatus is diagrammatically illustrated.

In the said drawing, where like reference characters indicate corresponding parts, 1 illustrates a charging pump which forces oil field emulsions or petroleum through a pipe 2 to the first of a battery of evaporators 3, each of said evaporators having an overflow pipe 4 at the desired liquid level leading to the next adjacent evaporator, said evaporators being arranged in stepped relation so that the liquid contents shall maintain a fixed level in each evaporator and shall flow by gravity to the next adjacent evaporator. The last and lowest evaporator has a discharge pipe 5 through which the cracked or finished product is conducted to a storage tank or the like (not shown).

In order to provide a heating source for the cracking of the contents of the evaporators, we propose to utilize the products of combustion given off from any suitable source, although we have provided a preferred method as will hereinafter appear, said products of combustion (in the nature of highly heated gases from which all oxygen has been removed) are led through a pipe 6 and a branch pipe 7 and are discharged through a suitably perforated nozzle 8 below the surface of the oil in the first evaporator, thus the highly heated gas bubbles up through the body of oil in the evaporator and cracks or breaks it down to a certain degree dependent upon the pressure and temperature maintained. The residue gases and vapors pass out of the upper part of the evaporator through a pipe 9 and are discharged through the nozzle 8 of the next evaporator, and this step is continued through all of the evaporators of the battery. Each evaporator is also provided with a valve controlled bypass 10 whereby the flue gasses may be passed around any desired evaporator so that it may be cleaned or the like, it being noted that other connections (not shown) must also be provided, but as they are common in the art they are not here detailed. The last evaporator discharges through a pipe 11 to a heat exchanger 12, from whence the cooled gases pass through pipe 13 to a scrubber or the like for the recovery of the more volatile elements such as aldehydes, gasoline, ketones, organic acids, etc.

From the above description, it will be apparent that practically any petroleum or its derivatives may be treated by the process and apparatus described and illustrated within the limit of the pressure and temperature of the flue gas used, it being understood in this connection that the entire system will be properly insulated at the desired points against loss of heat. With special reference to the process as employed in the cracking of oil field emulsions it is to be understood that each of the evaporators will possess such structural characteristics as to entrap a maximum quantity of salt and other foreign matter, it being apparent that as the liquid flows from one evaporator to the next that the oil will progressively lose its viscosity and permit the heavy foreign material to settle to the bottom of the evaporator. It will also be apparent that the water content will be removed by the hot gases and carried entirely out of the system.

As a convenient means of supplying the necessary highly heated flue gas for the working of the process, we have provided a furnace 14, upon which is mounted a suitably insulated heater 15 to which fuel oil or the like is fed through a valve controlled pipe 16, the heater normally standing substantially half full of oil. The oil in the heater is highly heated by the furnace to the point of ignition upon the admission of oxygen. Compressed air is now admitted through the pipe 17, said air being preliminarily heated by passing through the heat exchanger 12. The flow of air into the heater 15 below the surface of the oil is controlled by a valve 18. As the air enters the body of highly heated fuel oil, combustion takes place, the distance the air travels through the oil being sufficient to insure the complete absorption of the oxygen in the air to form carbon dioxide and other gases, as the admission of oxygen to the evaporators would probably lead to combustion of the material therein. After combustion within the heater has once been established, the heat of the furnace will no longer be necessary. The temperature of the gases developed by the furnace may be regulated by the rate of combustion which is dependent upon the quantity of air supplied to the heater through the valve 18. The flue gases are discharged through the pipe 6 to the first evaporator, it being noted in this connection that the pipe 6 is controlled by a pressure valve 19, making it possible to maintain a higher pressure, if desired, within the heater than that employed in the evaporators.

As an auxiliary means for the control of the combustion within the heater, a valve controlled pipe 20 leads thereto, said pipe being connected to a suitable blower or pressure pump 21 which draws, through a pipe 22, a proportion of the gases being discharged through the pipe 11 from the last evaporator to the heat exchanger.

From a consideration of the process and apparatus it will be evident a proportion of the fuel oil or the like in the heater 15 will be broken down, but that these products will be recovered in the evaporators by condensation. It will also be evident that any coke formed in the heater will be consumed almost as rapidly as it is formed.

From the above description, it will be apparent that we have produced a process of and apparatus for utilizing the products of combustion in the cracking of petroleum and its derivatives, and that said process and apparatus may be so regulated as to produce any desired temperature and to operate under any desired pressure dependent upon the material to be cracked and the extent to which the cracking process is to be carried. It is to be understood that while we have described and claimed the preferred embodiment of the invention, we reserve the right to make all changes properly falling within the spirit and scope of the appended claims.

We claim:

1. In apparatus for treating oil-field emulsions containing relatively large quantities of solids in suspension, a battery of tanks progressively elevated in series, connections between adjacent tanks for maintaining a predetermined liquid level in each tank by allowing liquid to flow from each tank to the next lower in the series, a spray head in each tank discharging below the liquid level therein, a gas supply pipe communicating with the spray head of the first tank, and connections from each tank above the liquid level therein to the spray head of the next succeeding tank.

2. In apparatus for treating oil-field emulsions containing relatively large quantities of solids in suspension, a heater, a battery of tanks progressively elevated in series, connections between adjacent tanks for maintaining a predetermined liquid level in each tank by allowing liquid to flow from each tank to the next lower in the series, a spray head in each tank discharging below the liquid level therein, a gas supply pipe from said heater communicating with the spray head of the first tank, connections from each tank above the liquid level therein to the spray head of the next succeeding tank, and a connection for returning a portion of said gas from the last tank of the series to the heater.

In witness whereof we hereunto affix our signatures.

LOUIS E. WINKLER.
FRED C. KOCH.